(12) United States Patent
Duncan

(10) Patent No.: US 10,896,265 B2
(45) Date of Patent: Jan. 19, 2021

(54) REGISTER ACCESS

(71) Applicant: Micron Technology, Inc., Boise, ID (US)

(72) Inventor: Kevin R. Duncan, Ramsey, MN (US)

(73) Assignee: Micron Technology, Inc., Boise, ID (US)

( * ) Notice: Subject to any disclaimer, the term of this patent is extended or adjusted under 35 U.S.C. 154(b) by 246 days.

(21) Appl. No.: 16/052,819

(22) Filed: Aug. 2, 2018

(65) Prior Publication Data
US 2020/0042744 A1 Feb. 6, 2020

(51) Int. Cl.
G06F 21/62 (2013.01)
G06F 9/30 (2018.01)
G06F 9/4401 (2018.01)
G06F 13/42 (2006.01)

(52) U.S. Cl.
CPC ...... G06F 21/6281 (2013.01); G06F 9/30101 (2013.01); G06F 9/4403 (2013.01); G06F 13/4282 (2013.01); *G06F 2213/0026* (2013.01)

(58) Field of Classification Search
CPC ............. G06F 21/6281; G06F 13/4282; G06F 9/4403; G06F 9/30101; G06F 2213/0026; G06F 21/79; G06F 21/44
USPC .......................................................... 726/30
See application file for complete search history.

(56) References Cited

U.S. PATENT DOCUMENTS

| 6,704,871 B1* | 3/2004 | Kaplan .................. G06F 21/72 713/192 |
| 2005/0076282 A1* | 4/2005 | Thompson ..... G01R 31/318385 714/739 |
| 2015/0006848 A1 | 1/2015 | Hinton et al. |
| 2016/0293239 A1 | 10/2016 | Giovannini et al. |
| 2017/0270062 A1 | 9/2017 | Sharma |
| 2018/0113648 A1* | 4/2018 | Brandl .................... G06F 13/16 |
| 2018/0122430 A1 | 5/2018 | Hinton et al. |

* cited by examiner

*Primary Examiner* — Kambiz Zand
*Assistant Examiner* — Aubrey H Wyszynski
(74) *Attorney, Agent, or Firm* — Brooks, Cameron & Huebsch, PLLC

(57) ABSTRACT

An example apparatus can include a memory device and a controller coupled to the memory device configured to receive a command including command information to access a register from a host device. The controller can grant access to the register in response to the controller determining the command is valid and/or deny access to the register in response to the controller determining the command is invalid. The controller can determine the command is valid by calculating an answer using a seed from the command in a formula and verifying the calculated answer matches an answer from the command. The command, once verified as valid, can allow the host device to access configuration registers and/or data registers.

20 Claims, 4 Drawing Sheets

US 10,896,265 B2

REGISTER ACCESS

TECHNICAL FIELD

The present disclosure relates generally to memory devices, and more particularly, to apparatuses and methods for register access.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

A storage device may include one or more memory components that store data. For example, a solid-state drive (SSD) may include memory devices such as non-volatile memory devices. The storage device may further include a storage device controller that may manage each of the memory devices and allocate data to be stored at the memory devices. A host system may utilize the storage device, and write data to and/or request data from the storage device. The storage device controller may be used to retrieve data from the corresponding memory devices and return the retrieved data to the host system.

DETAILED DESCRIPTION

Aspects of the present disclosure are directed to apparatuses and methods for register access by a host. Various embodiments provide technological advantages such as improved register access on a memory device via a bus that is also used to perform operation commands (such as read, write, and/or erase commands). As an example, for storage systems (e.g., solid state drives) with registers that are used to boot the memory devices, initialize hardware, and access data (e.g., debug data from debug logs) on the memory devices, embodiments of the present disclosure can utilize a bus, such as a bus that accesses PCIe address space, to send commands to access registers on the memory device. For instance, accessing registers on a memory device using PCIe address space can allow a host to initialize hardware, modify bits in the register to boot the memory device, and/or access debug logs via registers at a faster speed than using a side band bus.

In a number of embodiments, access to the registers via a bus that is also used to perform read, write, and/or erase commands can be protected via firmware and/or hardware on the memory devices. Command information sent by the host to access registers on the memory device can be protected by a formula that is common between the host and the firmware and/or hardware on the memory devices. The command information to access the register on the memory device can include a seed and an answer. The firmware and/or hardware on the memory device can receive and verify the command information by using the seed in the formula that is common to the host and the firmware and/or hardware on the memory device. The firmware and/or hardware generates an answer using the formula and the seed. If the answer generated by the firmware and/or hardware matches the answer supplied in the command information from the host, the command information is verified and access is provided to the registers on the memory devices. If the answer generated by the firmware and/or hardware does not match the answer sent in the command information from the host, the command information is not verified and discarded by the memory device and access is not granted to the registers on the memory devices. Embodiments of the present disclosure provide the benefit of a host accessing registers on memory device using the same address space that is used to perform read, write, and/or erase operations, while using a validation process to limit unauthorized access to the registers.

Figure 1:
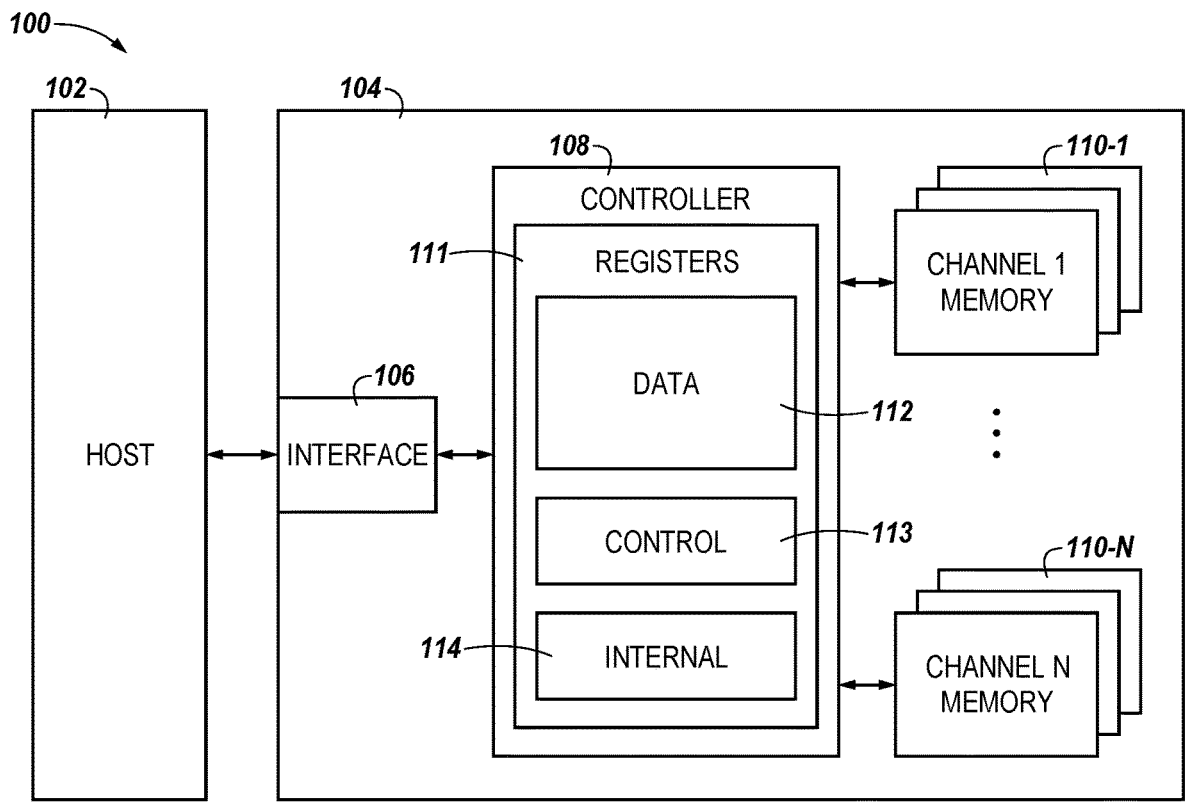
FIG. 1 illustrates a block diagram of an apparatus in the form of a computing system configured to access registers by the host in accordance with a number of embodiments of the present disclosure.

FIG. 1 illustrates a block diagram of an apparatus in the form of a computing system 100 in accordance with a number of embodiments of the present disclosure. As used herein, an "apparatus" can refer to, but is not limited to, a variety of structures or combinations of structures. For instance, memory system 104, controller 108, and memory devices 110-1 to 110-N might separately be considered an "apparatus".

The memory system 104 can be, for example, a storage system such as a solid state drive (SSD), and can include an interface 106, a controller 108 (e.g., a processor and/or other control circuitry), and a number of memory devices 110-1, . . . , 110-N, which may be referred to collectively as memory devices 110. The memory devices 110 can provide a storage volume for the memory system 104; however, one or more of the memory devices 110 may function as main memory for system 100.

As illustrated in FIG. 1, memory system 104 can be coupled to a host 102 via interface 106. Host 102 can be a host system such as a personal laptop computer, a desktop computer, a digital camera, a mobile device (e.g., cellular phone), network server, Internet of Things (IoT) enabled device, or a memory card reader, among various other types of hosts. Host 102 can include a number of memory access devices (e.g., a number of processors) capable of accessing memory devices 110 (e.g., via controller 108).

In the example illustrated in FIG. 1, the controller 108 is coupled to the memory devices 110 via multiple channels (e.g., CHANNEL 1 MEMORY, . . . , CHANNEL N MEMORY) and can be used to transfer data between the memory system 104 and host 102 (e.g., via interface 106). The interface 106 can be in the form of a standardized interface. For example, when the memory system 104 is used for data storage in a computing system 100, the interface 106 can be a serial advanced technology attachment (SATA), peripheral component interconnect express (PCIe), or a universal serial bus (USB), among other connectors and interfaces. In general, however, interface 106 can provide an interface for passing control, address, data, and other signals between the memory system 104 and a host 102 having compatible receptors for the interface 106.

The controller 108 can communicate with the memory devices 110 to control data read, write, and erase operations, among other operations. Although not specifically illustrated, in some embodiments, the controller 108 can include a discrete memory channel controller for each channel coupling the controller 108 to the memory devices 110. The controller 108 can include, for example, a number of components in the form of hardware (e.g., one or more integrated circuits) and/or software (e.g., instructions, which may be in the form of firmware) for controlling access to the number of memory devices 110 and/or for facilitating data transfer between the host 102 and memory devices 110. In general, the controller 108 can receive commands (e.g., operations) from the host 102 and can convert the commands into instructions or appropriate commands to achieve the desired access to the memory devices 110.

As described further herein, the controller 108 can be responsible for, among other operations, access to internal registers 114 in memory system 104 via registers 111. Registers 111 can include a data register 112 and a control register 113. Data register 112 can be used by host 102 to provide data to be written to registers within memory system 104 or to return data from registers within memory system 104 (e.g., internal register 114) to host 102 from and/or data associated with the memory arrays, such as debug data. Control register 113 can be used to initiate operations to write data placed in data register 112 by host 102, such as information to control the memory devices, such as booting the memory device and/or initializing hardware on the memory devices. Control register 113 can also be used to read data from registers within memory system 104 into data register 112 to be retrieved by host 102, such as data from memory devices and/or debug data. Assess to registers 111 within memory system 104 can be controlled by verifying the command information (e.g., seed and answer) provided in the control register 113 by host 102 using the controller 108. Controller 108 can use firmware and/or hardware that includes a formula that is shared with host 102. The host can write command information into control register 113 to access registers and information internal to memory system 104. The command information can include a seed and an answer that is based upon the formula in common with the firmware and/or hardware on controller 108. The firmware and/or hardware on controller 108 can verify the command information by using the seed written as part of the command information in control register 113 by host 102 to generate an answer. The answer generated by the firmware and/or hardware using the seed in the command information and the formula can be compared to the answer written as part of the command information in control register 113 by host 102. The command can be verified and executed if the answer generated by the firmware and/or hardware matches the answer written as part of the command information in control register 113 by host 102.

The memory devices 110 can include a number of arrays of memory cells. The memory devices 110 can include two-dimensional (2D) and/or three-dimensional (3D) array structures such as cross point array structures. The memory cells can include, for example, various types of cells, such as Flash memory cells, and/or memory cells having a resistance variable storage element and/or switch element (e.g., PCRAM cells, RRAM cells). As used herein, a storage element refers to a programmable portion of a memory cell. For instance, the memory devices 110 can be 3D cross point devices whose cells can include a "stack" structure in which a storage element is coupled in series with a switch element and which can be referred to herein as a 3D phase change material and switch (PCMS) device. 3D PCMS cells can include, for example, a two-terminal chalcogenide based storage element coupled in series with a two-terminal chalcogenide based switch element such as an ovonic threshold switch (OTS). In a number of embodiments, the memory cells can be self-selecting memory (SSM) cells in which a single material can serve as both the storage element and the memory element. An SSM cell can include a chalcogenide alloy; however, embodiments are not so limited.

As non-limiting examples, the memory cells of memory devices 110 can include a phase change material (e.g., phase change chalcogenide alloy) such as an indium(In)-antimony (Sb)-tellurium(Te) (IST) material (e.g., $In_2Sb_2Te_5$, $In_1Sb_2Te_4$, $In_1Sb_4Te_7$, etc.) or a germanium (Ge)-antimony (Sb)-tellurium (Te) (GST) material (e.g., $Ge_2Sb_2Te_5$, $Ge_1Sb_2Te_4$, $Ge_1Sb_4Te_7$, etc.).

As shown in FIG. 1, the controller 108 includes registers 111 having a data register 112 and a control register 113. Data register 112 can be used to transfer data from memory devices 110-1, . . . , 110-N or other internal registers 114 or storage entities, such as debug data, and/or data associated with the memory system 104. Control register 113 can be accessed by host 102 to request information, such as debug data for example, stored in memory devices 110-1, . . . , 110-N. The requested data can be transferred from memory devices 110-1, . . . , 110-N to host 102 via data register 112. Data register 112 can be used to store information to control the memory devices, such as booting the memory devices and/or initializing hardware on the memory devices. Host 102 can access control register 113 and to send data to the control register 113 that is used to boot memory devices 110-1, . . . , 110-N and/or initialize hardware in memory system 104.

The various components of controller 108, such as the firmware and/or hardware used to verify a command to access registers 111, can be discrete components such as application specific integrated circuit (ASICs) or the components may reflect functionally provided by circuitry and/or firmware within the controller 108 that does not necessarily have a discrete physical form separate from other portions of the controller 108. Although illustrated as registers within the controller 108 in FIG. 1, each of the registers 111, 112, and 113, or portions thereof, can be external to the controller 108.

Figure 2:
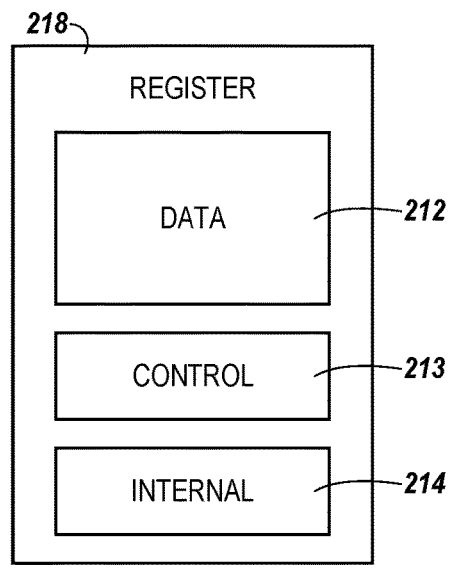
FIG. 2 is a block diagram of a number of registers in accordance with a number of embodiments of the present disclosure.

FIG. 2 is a block diagram of a number of registers in accordance with a number of embodiments of the present disclosure. In FIG. 2, register 211 includes a data register 212 and a control register 213. Register 211 can be located on a controller, such as controller 108 in FIG. 1, or in another location in a memory system. Register 211 can include a number of registers that can be used to access data in a memory system and/or control the components and function of a memory system. For example, data register 212 can be used to transfer data to and/or from memory devices, such as debug data, and/or data associated with a memory system. Control register 213 can be accessed by a host to request data, such as debug data for example, stored in memory devices and or in memory on a controller. The requested data can be transferred from memory devices and/or memory to a host via data register 212. Data register 212 can be used to store information to control the memory devices, such as booting the memory devices and/or initializing hardware on the memory devices. A host can access control register 213 to initiate transfer of data to and/or from data register 212 that is used to boot the memory devices and/or initialize hardware in a memory system.

Figure 3:
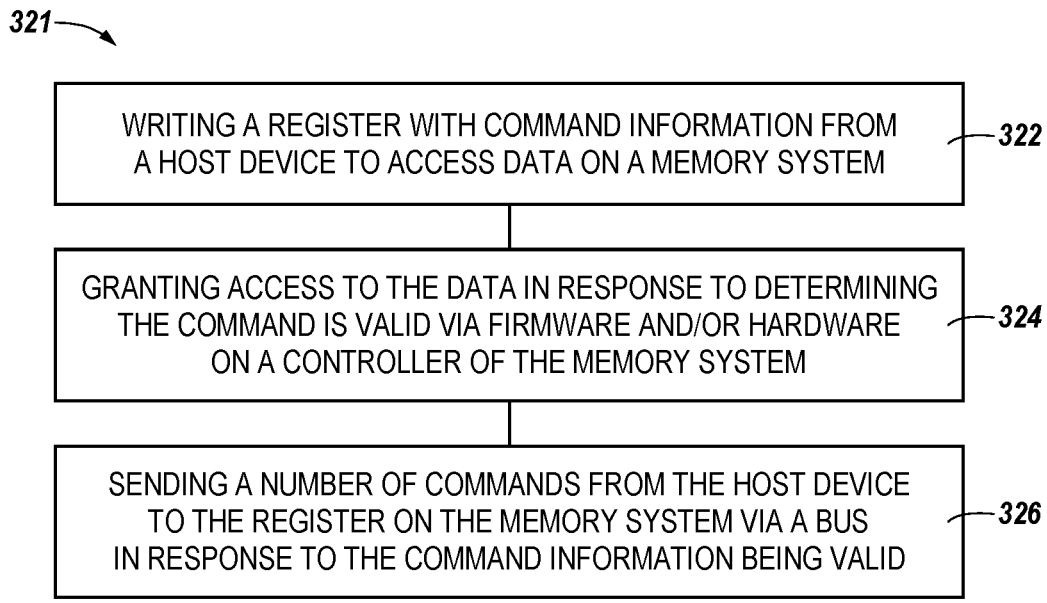
FIG. 3 is a flow diagram of an example method to access registers in a memory system in accordance with a number of embodiments of the present disclosure

FIG. 3 is a flow diagram of an example method to access registers in a memory system in accordance with a number of embodiments of the present disclosure. Method 321 can be performed by processing logic that can include hardware (e.g., circuitry, dedicated logic, programmable logic, microcode, etc.), software (such as instructions run on a processing device), firmware, or a combination thereof. Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various embodiments. Thus, not all processes are required in every implementation. Other process flows are possible.

At block 322, the method includes writing a register with command information from a host device to access data on a memory system. The register that is being written with command information can be a control register in PCIe address space that is visible to the host device, while the command information is requesting access to registers, RAM, and/or storage elements internal to the memory system that is not visible to the host device.

At block 324, the method includes granting access to the data (e.g., data in registers, RAM, and/or storage elements internal to the memory device) in response to determining the command information is valid via firmware and/or hardware on a controller of the memory system, as described in greater detail below in conjunction with FIG. 4 and FIG. 5. The method can include determining the command information is valid by calculating an answer using a seed from the command information in a formula and verifying the calculated answer matches an answer from the command information.

At block 326, the method includes sending a number of commands from the host device to the register on the memory system via a bus in response to the command information being valid. The number of commands can be executed on the memory system in response to the command information being valid. Executing the number of commands can include reading data in the memory system via data registers and/or writing data to data registers, such as configuration registers used to boot the memory system.

Figure 4:
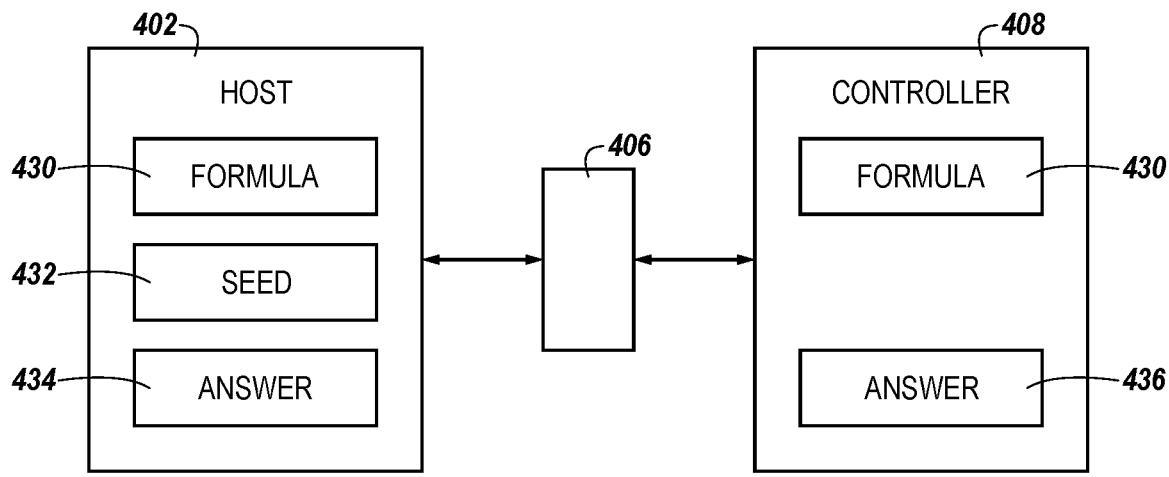
FIG. 4 is a block diagram illustrating the host accessing registers of a memory system in accordance with a number of embodiments of the present disclosure.

FIG. 4 is a block diagram illustrating the host accessing registers of a memory system in accordance with a number of embodiments of the present disclosure. In FIG. 4, host 402 can send a command to access registers on a memory system. Host 402 can send a command including command information that is based on formula 430. The controller 408 on a memory system to be accessed by host 402 can also include formula 430. The command information from host 402 can include seed 432 and answer 434. The seed 432 can be input into formula 430 and solved to determine answer 434. The seed 432 and answer 434 can be sent in a command to a memory system to access registers on the memory system. The command information including seed 432 and answer 434 can be sent to controller 408 via interface 406. Interface 406 can be an interface between host 402 and a memory system including controller 408. Interface 406 can be used to perform operations, such as read, write, and/or erase operations, on the memory system based on operation commands from host 402.

Controller 408 can receive the command information from host 402 that includes seed 432 and answer 434. Firmware and/or hardware on controller 408 can be used to solve formula 430 using seed 432. Controller 408 can solve formula 430 to determine answer 436. Controller 408 can compare answer 434 in the command from host 402 to answer 436 determined by controller 408. If answer 434 matches answer 436, the controller 408 can execute the command from host 402 and allows the host to access registers on the memory system. Controller 408 can write a positive indication to the register where the command information was written indicating that the command was verified as valid by controller 408 in response to answer 434 matching answer 436. The host can read the register with the positive indication to learn that the host has access to the data in the memory system. If answer 434 does not match answer 436, the controller 408 discards the command from host 402.

For example, formula 430 shared between host 402 and controller 408 can be:

$$X_{k+1} = (a * X_K + c) \bmod m$$

where $X_k$ is the seed 432 in formula 430. Seed 432 can be any positive odd integer; a is a constant equal to 8*z+5, where z is a positive integer such as 26 in this example; c is 0; and m is $2^e$, where e is 8. In one example, the command can include seed 432 of 203 (0xCB) and the third answer 434 in the sequence of 231 (0x6F). The controller 408 can receive the seed 432 and use the seed 432 in formula 430. The controller 408 can use formula 432 to calculate the third answer in the sequence as follows:

$$X1 = (0xD5 * 0xCB) \bmod 0x100 = 0xE7$$

$$X2 = (0xD5 * 0xE7) \bmod 0x100 = 0x33$$

$$X3 = 90xD5 * 0x33) \bmod 0x100 = 0x6F$$

The answer 436 of the calculation by controller is 0x6F which matches the answer 434 sent by the host in the command. The controller can determine the command is valid in response to answer 436 matching 434 and can write a response with a positive indication to the register where the command information was written indicating the command is valid. The response can be 0xFFFFFFFF, for example. The host 402 can send commands to the register to read and/or write data to the memory system via the control and data registers in response to receiving the response indicating the command is valid.

Figure 5:
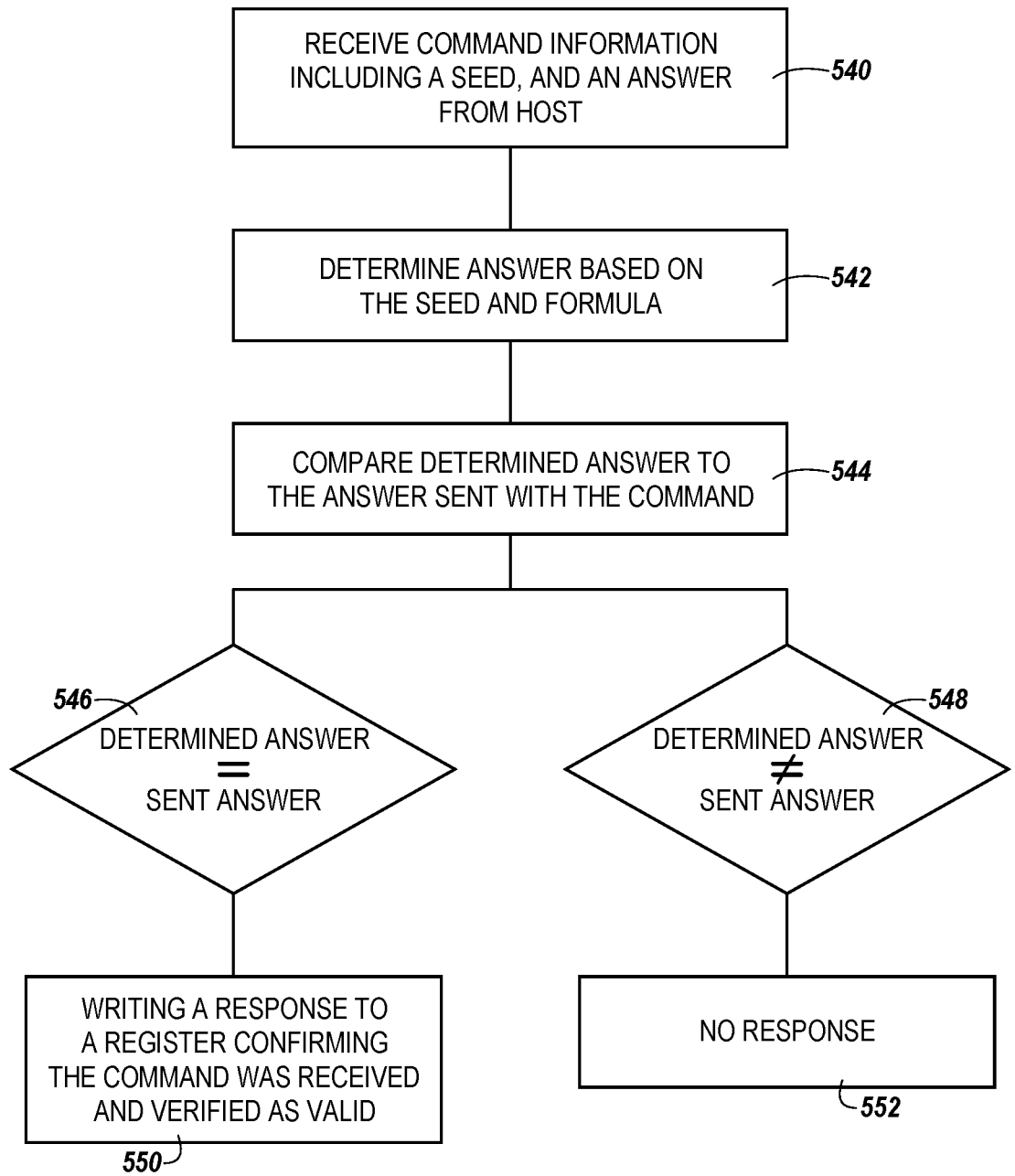
FIG. 5 is a flow diagram illustrating an example process of the host accessing registers of a memory system in accordance with a number of embodiments of the present disclosure.

FIG. 5 is a flow diagram illustrating an example process of the host accessing registers of a memory system in accordance with a number of embodiments of the present disclosure. The process described in FIG. 5 can be performed by, for example, a controller such as controller 108 shown in FIG. 1. At block 540, a controller can receive a command including command information comprising a seed and an answer from a host. The command can include the seed and answer. The command from the host can be a request to access registers on a memory system. The seed and answer can be based on a formula that is common amongst the host that sent the command and the controller on the memory system that received the command.

At block 542, the process includes determining an answer based on the seed and formula sent by the host. The controller can include firmware and/or hardware to solve the formula common to the host and the controller. The controller can input the seed received from host into the formula to determine an answer. The formula can be an iterative process and the answer determined by the controller and received from the host can be a particular portion of the iterative process. For example, the answer can be a portion of the third answer determined during the iterative process.

At block 544, the process includes comparing the answer determined by the controller to the answer sent by the host with the command. The command can be verified as valid by comparing the answer determined by the controller to the answer sent by the host with the command.

As shown at block 546, if the answer determined by the controller matches, (e.g., is equal to), the answer sent by the host with the command, the command is verified as valid by the controller.

At block 550, the process includes writing a response to a register (e.g., control register) confirming the command was received and is verified as valid by the controller in response to determining the answer determined by the controller matches the answer sent by the host with the command. In response to confirming that the command is verified as valid, the command can be executed by the controller to allow the host to access registers. The host can access registers on a memory device using address space that is used perform data operation on a memory system, such as PCIe address space, and can allow a host to initialize hardware, modify bits in the register to boot the memory device, and/or access debug data via registers at a much faster speed than using a side band bus.

As shown at block 548, if the answer determined by the controller does not match, (e.g., is not equal to), the answer sent by the host with the command, the command is not verified as valid by the controller.

At block 552, the process includes not writing a response indicating the command to a register (e.g., control register) to the host when the command is not verified as valid by the controller in response to determining the answer determined by the controller did not match the answer sent by the host with the command. The controller can discard the command.

Figure 6:
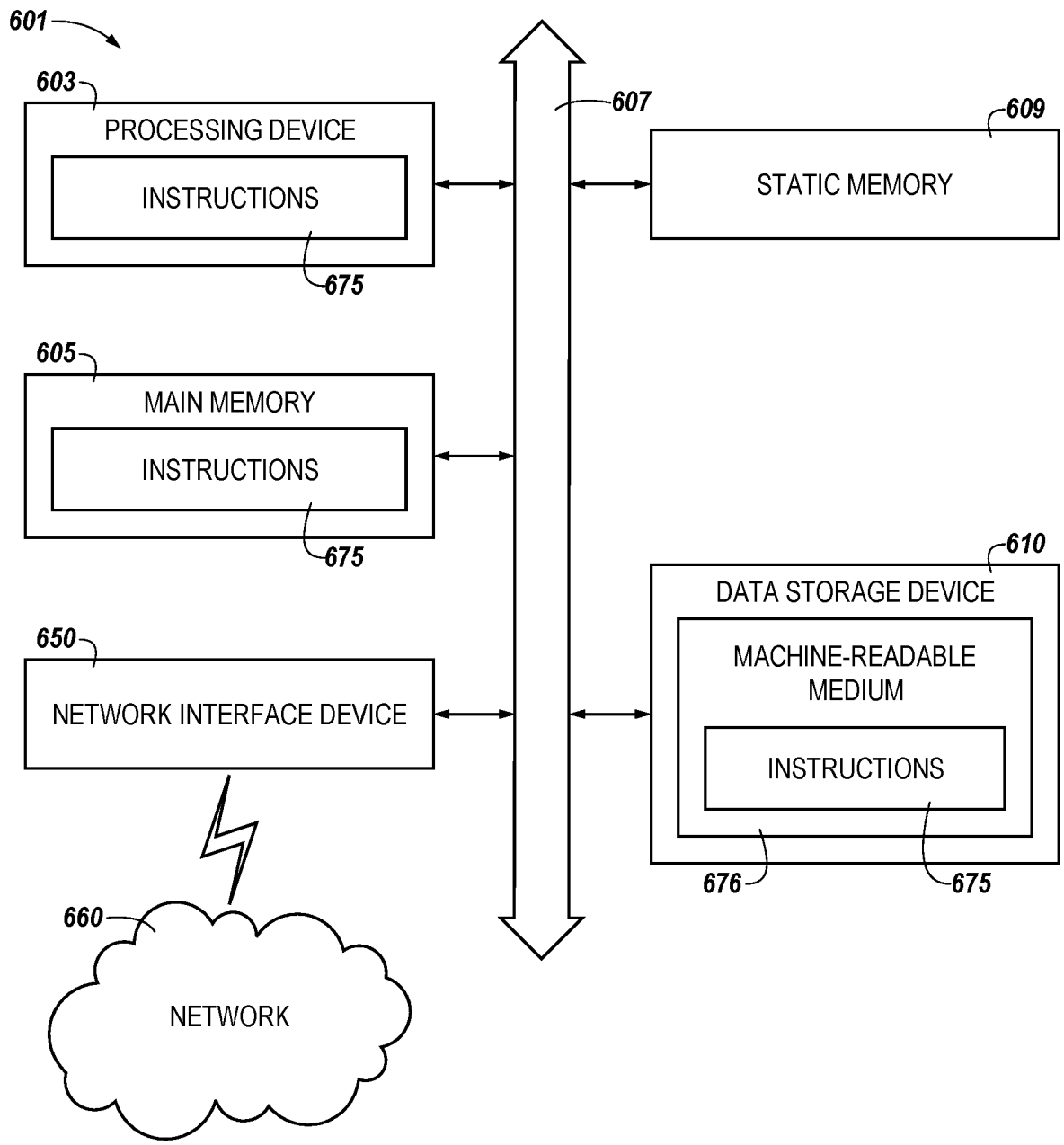
FIG. 6 is a block diagram of an example apparatus in the form of a computing system in which implementations of the present disclosure may operate.

FIG. 6 illustrates an example machine of a computing system 600 within which a set of instructions, for causing the machine to perform any one or more of the methodologies discussed herein, may be executed. For example, the computing system 600 may correspond to a host system (e.g., the host 102 of FIG. 1) that includes or utilizes a memory system (e.g., the memory system 104 of FIG. 1) or may be used to perform the operations of a controller. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein. The example computing system 600 includes a processing device 603, a main memory 605 (e.g., read-only memory (ROM), flash memory, dynamic random access memory (DRAM) such as synchronous DRAM (SDRAM) or Rambus DRAM (RDRAM), etc.), a static memory 609 (e.g., flash memory, static random access memory (SRAM), etc.), and a data storage device 610, which communicate with each other via a bus 607.

Processing device 603 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 603 may also be one or more special-purpose processing devices such as an application specific integrated circuit (ASIC), a field programmable gate array (FPGA), a digital signal processor (DSP), network processor, or the like. The processing device 603 is configured to execute instructions 675 for performing the operations and steps discussed herein. The computing system 600 may further include a network interface device 650 to communicate over the network 660.

The data storage device 610 may include a machine-readable storage medium 676 (also known as a computer-readable medium) on which is stored one or more sets of instructions or software 675 embodying any one or more of the methodologies or functions described herein. The instructions 675 may also reside, completely or at least partially, within the main memory 605 and/or within the processing device 603 during execution thereof by the computing system 600, the main memory 605 and the processing device 603 also constituting machine-readable storage media. The machine-readable storage medium 676, data storage device 610, and/or main memory 605 may correspond to the memory system 104 of FIG. 1.

In one implementation, the instructions 675 include instructions to implement functionality corresponding to a programming component. While the machine-readable storage medium 676 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, aspects of the present disclosure may refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computing system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computing system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. An apparatus, comprising:
a memory device; and
a controller coupled to the memory device configured to:
receive a command including command information to access a register from a host device, wherein the command is received to a control register in peripheral component interconnect express (PCIe) address space that is visible to the host device and the register that is requested for access is not visible to the host device;
grant access to the register in response to the controller determining the command is valid; and
deny access to the register in response to the controller determining the command is invalid.

2. The apparatus of claim 1, wherein the controller is configured to determine the command is valid by calculating an answer using a seed from the command information in a formula and verifying the calculated answer matches an answer from the command.

3. The apparatus of claim 1, wherein the controller is configured to determine the command is invalid by calculating an answer using a seed from the command in a formula and determining the calculated answer is different than an answer from the command.

4. The apparatus of claim 1, wherein the controller is configured to write a response to the register indicating access to the register is granted in response to determining the command is valid.

5. The apparatus of claim 1, wherein the controller is configured to discard the command in response to determining the command is invalid.

6. The apparatus of claim 1, wherein the controller is configured to execute commands from the host device in response to granting access to the register.

7. The apparatus of claim 1, wherein the command is received on a bus operating using a peripheral component interconnect express (PCIe) standard.

8. A system comprising:
a host device; and
an apparatus coupled to the host device, wherein the apparatus includes a memory device coupled to a controller and wherein the controller is configured to:
grant access to a register on the apparatus by determining a command sent from the host device to the apparatus is valid by calculating an answer using a seed from the command in a formula and verifying the calculated answer matches an answer from the command, wherein the command is received to a control register in peripheral component interconnect express (PCIe) address space that is visible to the host device and the register that is requested for access is not visible to the host device; and execute a number of commands sent from the host device to the apparatus in response to access to the register being granted.

9. The system of claim 8, wherein the controller is configured to write a response to the register indicating access to the register is granted in response to determining the command is valid.

10. The system of claim 9, wherein response is 0xFFFFFFFF.

11. The system of claim 8, wherein the controller is configured to execute the number of commands by sending debug data from the memory device to the host device.

12. The system of claim 8, wherein controller is configured to execute the number of commands by writing data to a data register.

13. The system of claim 12, wherein the data written to the data register is used to boot the apparatus.

14. The system of claim 8, wherein the number of commands are executed using a bus that also is used to access memory space visible to the host device.

15. A method, comprising:
receiving a command from a host device to access a register on a memory system, wherein the command is received to a control register in peripheral component interconnect express (PCIe) address space that is visible to the host device and the register that is requested for access is not visible to the host device;
granting access to the register in response to determining the command is valid via firmware on a controller of the memory system; and
sending a number of commands from the host device to the register on the memory system via a bus in response to the command being valid.

16. The method of claim 15, wherein determining the command is valid includes calculating an answer using a formula and a seed from the command and verifying the calculated answer matches an answer from the command.

17. The method of claim 15, further including executing the number of commands in response to the command being valid.

18. The method of claim 15, wherein executing the number of commands includes writing data to a data register used to boot the memory system.

19. The method of claim 15, wherein executing the number of commands includes sending debug data to the host device.

20. The method of claim 15, wherein granting access to the register includes granting access through PCIe address space.

* * * * *